S. BAKOS.
WRIST PIN LUBRICATOR.
APPLICATION FILED JUNE 8, 1916.

1,218,507.

Patented Mar. 6, 1917.
2 SHEETS—SHEET 1.

Inventor
S. Bakos

By A. M. Wilson
Attorney

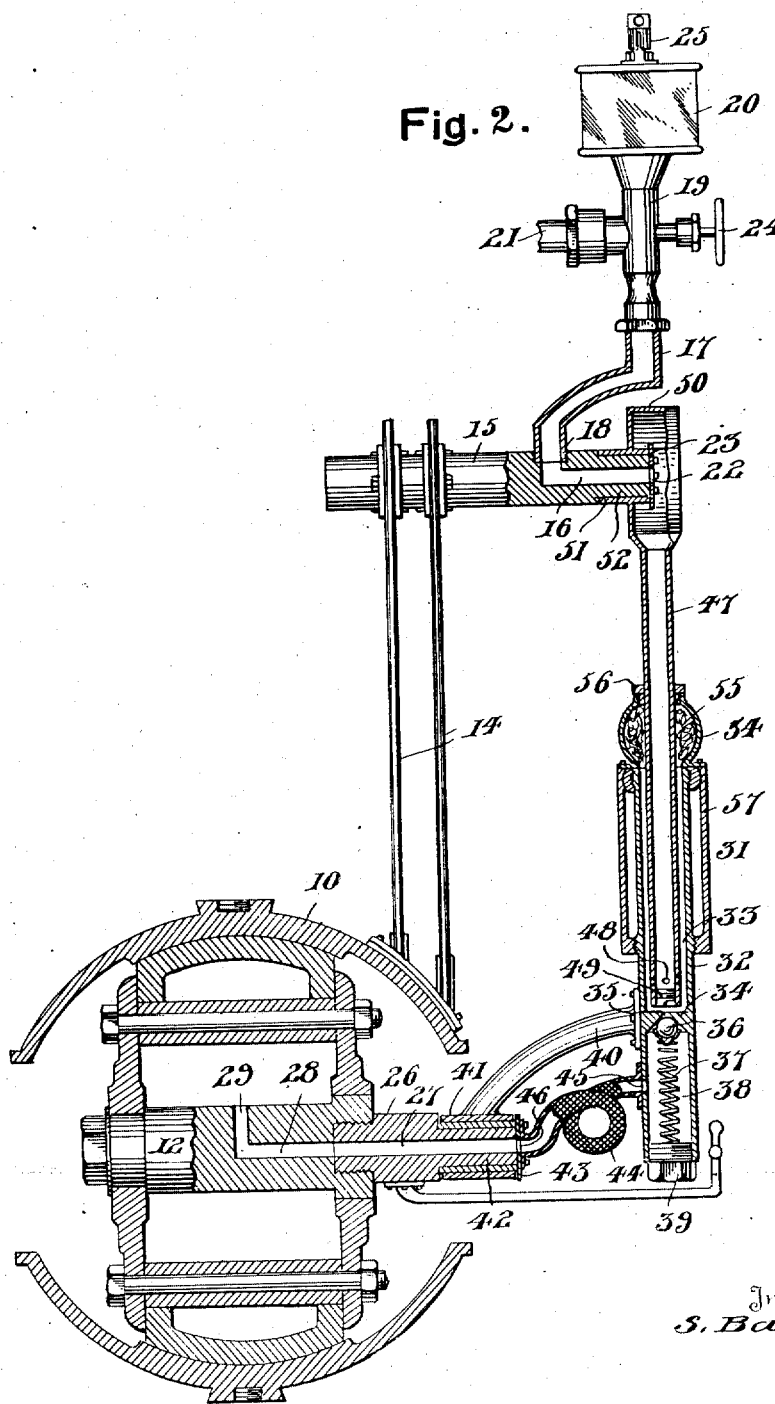

UNITED STATES PATENT OFFICE.

STEVE BAKOS, OF BRAINARDS, NEW JERSEY.

WRIST-PIN LUBRICATOR.

1,218,507.  Specification of Letters Patent.  Patented Mar. 6, 1917.

Application filed June 8, 1916. Serial No. 102,502.

*To all whom it may concern:*

Be it known that I, STEVE BAKOS, a subject of the King of Hungary, residing at Brainards, in the county of Warren and State of New Jersey, have invented certain new and useful Improvements in Wrist-Pin Lubricators, of which the following is a specification.

This invention relates to certain new and useful improvements in wrist pin lubricators.

The primary object of the invention is the provision of a lubricator for the wrist pins of reciprocating members such as the piston rods of engines, the device being adapted to forcibly feed the lubricant to the working parts simultaneously with the operation of the machine.

A further object of the device is to provide a lubricator for reciprocating wrist pins, the lubricator having anchoring connections with the machine whereby a pumping action is produced forcing the lubricant to the wrist pin, provision being made for readily viewing the lubricant supply.

A still further object of the device is the provision of a lubricator for axles having one part movable with the axle and another portion maintained by the stationary part of the machine whereby a forced feed is produced during the operation of the machine, a fluid pressure connection being also arranged for the lubricating column.

With these general objects in view and others that will appear as the nature of the invention is better understood, the same consists in the novel construction, combination and arrangement of parts hereinafter more fully described, illustrated in the accompanying drawings, and then claimed.

In the drawings forming a part of this application and in which like designating characters refer to corresponding parts throughout the several views:—

Fig. 2 is a vertical central sectional view of the device so arranged but illustrating the elements with the wrist pin centrally of its stroke, and, Fig. 3 is an enlarged elevational view of the feed supply pivoted bearing connection employed with the device.

Figure 3:
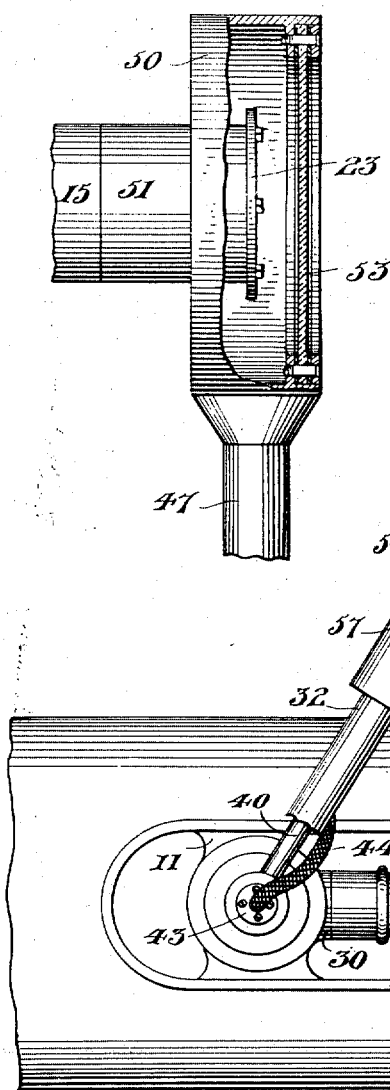

It being understood that the present device is adaptable for lubrication of wrist pins, axles and similar members, the same is herein illustrated in connection with a machine having an elongated support or guideway 10 for a cross head 11, a wrist pin 12 being carried transversely of the said cross head 11, a reciprocating rod 13 being journaled upon the pin 12, all in substantially the usual manner.

An upright post member 14 is carried by the support 10 being arranged thereon at substantially a point midway of the reciprocating path of travel of the cross head 11, the said post being provided with an outwardly extending horizontally arranged cylindrical bar 15 having an angular bore 16 opening axially in the outer end of the bar 15 and adapted for the passage of lubricating fluid therethrough. A lubricating pipe 17 is threaded into the inner end 18 of the bore 16 having a valve casing 19 mounted thereon, the said casing being provided with a cup 20 adapted to contain a supply of lubricating oil and being of the usual construction. A fluid pressure supply pipe 21 enters the casing 19 for supplying pressure furnished by steam or compressed air for forcing the lubricant through the pipe 17 and bore 16 outwardly through the central opening 22 in a stub plate 23 mounted upon the outer reduced end of the bar 15 and being of greater diameter than the said bar. A regulating valve 24 is carried by the casing 19 for controlling the supply of fluid from the pipe 21 while a regulator 25 is carried by the oil cup 20 for regulating the feed of the oil.

A stub pipe 26 is rigidly carried by the wrist pin 12 having an axial bore 27 in alinement with and communicating with a bore 28 extending through the pin 12 with an open end 29 arranged centrally of the periphery of the said pin and constituting the outlet for the lubricant inwardly of the connecting sleeve 30 of the said rod.

A lubricating pump 31 is pivotally carried by the stub pipe 26 and bar 15 whereby the lubricant from the bar bore 16 is forcibly fed into the stub pipe bore 27. This lubricant pump consists of a tubular casing 32 having an oil chamber 33 arranged therein while a partition or false bottom 34 is provided in the said casing having a contracted oil outlet 35 controlled by a ball valve 36 normally maintained seated by means of a spring 37 positioned within the lower portion 38 of the chamber 33, the lower end of the spring being seated upon a closing cap nut 39, which nut may be turned when desired for regulating the tension of the valve spring 37. An arm 40 is rigidly carried by the casing 32 outwardly of the partition 34 while its opposite or lower end is provided with a sleeve 41 journaled upon the reduced outer end portion 42 of the said stub pipe and retained by a stop disk 43. A flexible hose connection 44 communicates with a feed port 45 in the casing 32 communicating with the chamber portion 38 and the stub pipe bore 27 through a central perforation 46 in the said disk 43.

A tubular piston 47 is slidably arranged freely extending within the casing chamber 33 and provided with side ports 48 adjacent its inner end which is closed by a plug 49, it being noted that the said inner end is slightly spaced from the casing partition 34 when the piston 47 is at the inward limit of its stroke as illustrated in Fig. 2 of the drawings. A cylindrical head 50 is provided upon the piston rod 47, the said head being journaled by means of a sleeve 51 upon the reduced outer end 52 of the bar 15, the sleeve being retained thereon by means of the afore-mentioned plate 23 and whereby the piston is swingingly mounted upon the bar 15 while the casing 32 by means of the sleeve 41 is swingingly mounted upon the reciprocating stub pipe 26 as heretofore described.

A sight glass 53 is arranged in the outer side of the head 50 whereby the flow of the lubricating oil through the bore 16 and outlet perforation or port 22 is readily observable.

Figure 1:
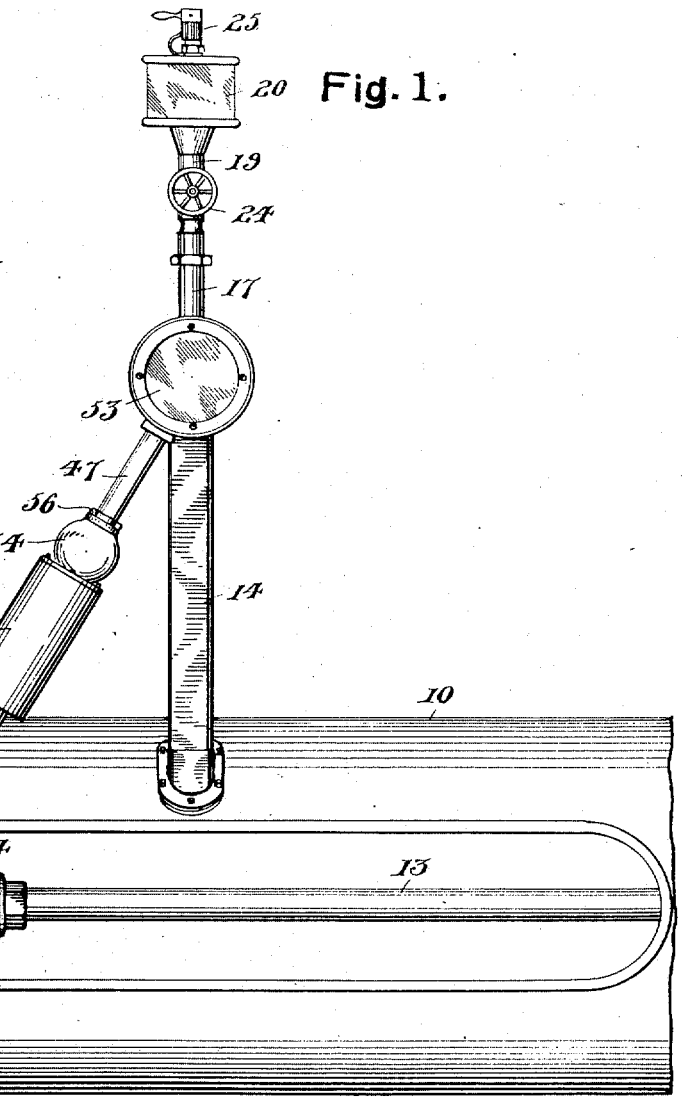
Figure 1 is a side elevation of the device operatively arranged upon a machine.

A form of stuffing box 54 is mounted upon the casing 32 adapted for the reception of an absorbent packing 55 while a packing washer 56 is arranged in the outer end of the box, the said absorbent material and packing coming in contact with the reciprocating piston 47. A protecting jacket 57 is also provided for the upper end portion of the said casing 32. In operation, when the elements are positioned as illustrated in Fig. 1, the cross head 11 being at one extreme limit of its stroke, the piston 47 will be partially withdrawn from the chamber 33, or in other words, the inner free end of the piston will be at a considerable distance from the valve seat 35 while the chamber 33 will be filled with oil from the oil cup 20 which oil will surround the inner end of the piston and fill the chamber 33 in advance of the inner end of the piston. Upon the next stroke of the cross head 11, the inner end of the piston 47 will approach the valve seat partition 34 until the piston 47 and the post 14 are substantially parallel and at which time the piston 47 and casing 32 will be arranged upright with the piston plug 49 at its nearest approach to the valve seat partition 34 as illustrated in Fig. 2 of the drawings. Such reciprocation of the piston 47 acts as the ordinary pump to unseat the ball 36 forcing the oil into the casing chamber 38 and thence through the connection 44 and stub pipe bore 27 to the wrist pin bore 28 and outwardly through the lubricating port 29 thereof. The aggregate area of the ports 48 is greatly less than the inner end of the member 47, which will permit only a small amount of the lubricant to flow back into the interior of the member 47 and cause said member to act as a pump.

It will thus be understood that the pump 31 operates simultaneously with the reciprocations of the cross head 11 for forcibly driving the lubricant onto the surface of the wrist pin 12 to be lubricated while the flow of oil from the cup 20 to the pump casing chamber 33 is not only effected by gravity but also by fluid under pressure admitted to the valve casing 19 through the inlet pipe 21.

While the present form of the invention is believed to be preferable, it will be understood that minor changes may be made without departing from the spirit and scope of the invention as claimed.

What I claim as new is:—

1. A lubricator comprising in combination with a support having a wrist pin reciprocatingly mounted upon the support, an upright post fixedly carried by the said support, an outwardly extending bar carried by the said post and arranged with an oil feed bore through the outer end thereof, a stub pipe fixed to the outer end of the said wrist pin in parallelism with the said bar, the said wrist pin and pipe being arranged with an oil conduit therethrough opening at one end at the periphery of the pin and at its opposite end centrally of the outer end of said pipe, a casing pivotally mounted upon the outer free end of the said stub pipe and having an oil chamber therein, a partition within the said casing having a valve seat opening therethrough, a valve for the said seat, tubular connections between the said stub pipe bore and the adjacent end of said casing, an oil feed piston reciprocatingly mounted within the said casing, and a cylindrical head upon the said piston pivotally attached to the said bar and communicating with the bore of said bar.

2. A lubricator comprising in combination with a support having a wrist pin reciprocatingly mounted upon the support, an upright post fixedly carried by the said support, an outwardly extending bar carried by the said post and arranged with an oil feed bore through the outer end thereof, a stub pipe fixed to the outer end of the said wrist pin in parallelism with the said bar, the said wrist pin and pipe being arranged with an oil conduit therethrough opening at one end at the periphery of the pin and at its opposite end centrally of the outer end of said pipe, a casing pivotally mounted upon the outer free end of the said stub pipe and having an oil chamber therein, a partition within the said casing having a valve seat opening therethrough, a valve for the said seat, tubular connections between the said stub pipe bore and the adjacent end of said casing, an oil feed piston reciprocatingly mounted within the said casing, a cylindrical head upon the said piston pivotally attached to the said bar and communicating with the bore of said bar, an oil feed pipe carried by the said bar in communication with the bore thereof, a controlled oil supply means mounted upon the said pipe, and a fluid pressure pipe in communication with the said supply means.

In testimony whereof I affix my signature.

STEVE BAKOS.